United States Patent
Desai et al.

(10) Patent No.: US 11,494,090 B2
(45) Date of Patent: Nov. 8, 2022

(54) SYSTEMS AND METHODS OF MAINTAINING FAULT TOLERANCE FOR NEW WRITES IN DEGRADED ERASURE CODED DISTRIBUTED STORAGE

(71) Applicant: VMware Inc., Palo Alto, CA (US)

(72) Inventors: Asit Desai, Cupertino, CA (US); Wenguang Wang, Santa Clara, CA (US); Eric Knauft, San Francisco, CA (US); Vamsi Gunturu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 244 days.

(21) Appl. No.: 17/033,610

(22) Filed: Sep. 25, 2020

(65) Prior Publication Data

US 2022/0100392 A1    Mar. 31, 2022

(51) Int. Cl.
*G06F 3/06* (2006.01)
*G06F 11/10* (2006.01)

(52) U.S. Cl.
CPC .......... *G06F 3/0619* (2013.01); *G06F 3/0629* (2013.01); *G06F 3/0652* (2013.01); *G06F 3/0653* (2013.01); *G06F 3/0689* (2013.01); *G06F 11/1088* (2013.01); *G06F 11/1096* (2013.01)

(58) Field of Classification Search
CPC .... G06F 3/0619; G06F 3/0629; G06F 3/0652; G06F 3/0653; G06F 3/0689; G06F 11/1088; G06F 11/1096; G06F 11/1004; G06F 11/2082; G06F 2201/81
See application file for complete search history.

(56) References Cited

U.S. PATENT DOCUMENTS

| | | | |
|---|---|---|---|
| 7,549,089 B1 | 6/2009 | Kimmel et al. | |
| 8,386,834 B1 * | 2/2013 | Goel | G06F 11/108 |
| | | | 714/6.22 |
| 8,595,595 B1 | 11/2013 | Grcanac et al. | |
| 10,127,113 B1 * | 11/2018 | Bonwick | G06F 11/108 |
| 10,592,138 B1 * | 3/2020 | Han | G06F 3/0631 |
| 10,691,354 B1 * | 6/2020 | Kucherov | G06F 3/0689 |
| 2003/0145270 A1 | 7/2003 | Holt | |
| 2004/0128470 A1 | 7/2004 | Hetzler et al. | |

(Continued)

*Primary Examiner* — Matthew M Kim
*Assistant Examiner* — Matthew N Putaraksa
(74) *Attorney, Agent, or Firm* — Fish & Richardson P.C.

(57) ABSTRACT

Methods, systems, and apparatus, including computer programs encoded on computer storage media, for maintaining fault tolerance for new writes in a storage system when one or more components of the storage system are unavailable. One of the methods includes determining that one or more first disks of a capacity object of a storage system are unavailable, wherein the storage system comprises a segment usage table identifying the plurality of segments of the capacity object; in response: identifying a plurality of available second disks, adding a plurality of new segments corresponding to the second disks to the capacity object, and adding data identifying the plurality of new segments to the segment usage table; and for each of one or more new write requests to the capacity object: identifying an available segment from the plurality of new segments, and writing data associated with the new write request to the identified available segment.

27 Claims, 8 Drawing Sheets

(56) References Cited

U.S. PATENT DOCUMENTS

| | | |
|---|---|---|
| 2007/0180348 A1 | 8/2007 | Corbett et al. |
| 2008/0168225 A1 | 7/2008 | O'Connor et al. |
| 2008/0195808 A1* | 8/2008 | Chi .................. G06F 3/0619 |
| | | 711/E12.084 |
| 2008/0282105 A1 | 11/2008 | Dennadhayalan et al. |
| 2009/0083504 A1 | 3/2009 | Belluomini et al. |
| 2012/0079190 A1 | 3/2012 | Colgrove et al. |
| 2012/0084505 A1 | 4/2012 | Colgrove et al. |
| 2014/0019701 A1* | 1/2014 | Ohira .................. G06F 3/0653 |
| | | 711/165 |
| 2014/0317479 A1 | 10/2014 | Candelaria |
| 2015/0095697 A1 | 4/2015 | Bonwick et al. |
| 2015/0134926 A1* | 5/2015 | Yang .................. G06F 3/0652 |
| | | 711/167 |
| 2016/0077746 A1* | 3/2016 | Muth .................. G06F 3/0644 |
| | | 711/159 |
| 2017/0024295 A1* | 1/2017 | Klughart ............ G06F 11/1662 |
| 2017/0075781 A1* | 3/2017 | Bennett, Jr. ......... G06F 3/0619 |
| 2017/0168897 A1* | 6/2017 | Blaum .................. G06F 3/067 |
| 2017/0242587 A1 | 8/2017 | Blaum et al. |
| 2018/0300212 A1* | 10/2018 | Gong .................. G06F 11/1092 |
| 2019/0332480 A1 | 10/2019 | Kang et al. |
| 2020/0341663 A1* | 10/2020 | Gao .................. G06F 3/0619 |
| 2021/0349791 A1* | 11/2021 | Wang .................. G06F 11/1076 |

* cited by examiner

Segment Usage Table 400

| Segment ID | Previous | Next | Num. Live Blocks | Transaction ID |
|---|---|---|---|---|
| 0 | - | 55 | 83 | tx-ID$_1$ |
| ... | ... | ... | ... | ... |
| 23 | 55 | - | 102 | tx-ID$_3$ |
| ... | ... | ... | ... | ... |
| 55 | 0 | 23 | 40 | tx-ID$_2$ |
| ... | ... | ... | ... | ... |
| M - 1 | - | - | 0 | - |

410

Segment 0 ↔ Segment 55 ↔ Segment 23

| Segment ID | Previous | Next | Num. Live Blocks | Transaction ID | Read Only |
|---|---|---|---|---|---|
| 0 | - | 55 | 83 | tx-ID$_1$ | Yes |
| ... | ... | ... | ... | ... | ... |
| 23 | 55 | M | 102 | tx-ID$_3$ | Yes |
| ... | ... | ... | ... | ... | ... |
| 55 | 0 | 23 | 40 | tx-ID$_2$ | Yes |
| ... | ... | ... | ... | ... | ... |
| M − 1 | - | - | 0 | - | Yes |
| M | 23 | - | 120 | tx-ID$_4$ | No |
| ... | ... | ... | ... | ... | ... |
| M + N − 1 | - | - | 0 | - | No |

Updated Segment Usage Table 600

SYSTEMS AND METHODS OF MAINTAINING FAULT TOLERANCE FOR NEW WRITES IN DEGRADED ERASURE CODED DISTRIBUTED STORAGE

BACKGROUND

This specification generally relates to data storage virtualization.

A common architecture for data storage virtualization is a redundant array of independent disks (RAID), where multiple disk drives, also called simply "disks," are combined into a single logical unit for the purpose of data redundancy. There are multiple different RAID levels that each define a different procedure for distributing data across the multiple disks.

One common RAID level is RAID-1, where every item of data written to the storage system is copied, or "mirrored," at least once. For example, there might be two disks in a RAID-1 array, where all of the data written to the first disk is mirrored to the second disk. Thus, every disk except one in a RAID-1 array can fail and the system can restore the data without data loss. This fault tolerance comes at the cost of space efficiency and write efficiency. That is, with n disks, a RAID-1 array has a usable capacity of 1/nth the capacity of the array, and every write operation requires n operations to amplify the write across the array.

Another common RAID level is RAID-6, where multiple "primary" disks store data that is supported by two "parity" disks. A parity disk provides fault tolerance to the primary disks, so that if a primary disk fails, a system can restore the data of the failed primary disk without data loss. Typically there are two parity disks in a RAID-6 array, which allows for up to two disk failures, across the primary disks and the parity disks, without loss of data. A RAID-6 array employs block-level striping, where each disk is segmented into multiple blocks, and where logically sequential blocks are stored on different disks. The group of corresponding blocks in each of the disks of a RAID-6 array is called a "stripe," and the size of a single block is called the "stripe size" of the array.

As with RAID-1, the fault tolerance of RAID-6 comes at the cost of lower capacity and write efficiency. For instance, a RAID-6 array might have 4 primary disks and 2 parity disks. In this case, the usable capacity of the array is ⅔rds the capacity of the array. To write to a single block of a primary disk of the array requires 6 read and write operations: the system must i) read the current value of the block of the primary disk and the current values of the corresponding blocks of the two parity disks, ii) compute an update to the values of the blocks of the parity disks given the new data in block of the primary disk, and iii) write the new data to the block of the primary disk and the new values to the blocks of the two parity disks.

In some RAID-6 implementations, a storage system can improve the write efficiency of the array by executing a "full-stripe write," where the system writes data to every block in a stripe at once. In the example where there are 4 primary disks and 2 parity disks, a single full-stripe write only requires 1.5× operations, i.e., writing data to the 4 blocks of the primary disks requires writing to the 2 blocks of the parity disks.

SUMMARY

This specification generally describes a storage system that can utilize a meta object and a capacity object to execute full-stripe writes of user data to the capacity object.

In particular, an external system, e.g., a user or user system, can store data by sending a write request to the meta object of the storage system. The meta object can store the data until the amount of data stored by the meta object, cumulatively across one or more different write requests, exceeds a certain threshold. Once the threshold is exceeded, the meta object can execute one or more full-stripe writes to the capacity object. If a portion of the data in the full-stripe write is replacing old data that is already stored in the capacity object, then instead of overwriting the old data in an inefficient single-block write, the capacity object can execute the full-stripe write and update a logical map that tracks the location of the most recent version of each piece of data. Then, when an external system submits a read request for the data, the capacity object can determine, using the logical map, the location of the most recent version of the requested data, and retrieve the requested data and provide it to the external system.

The capacity object can include multiple primary disks and multiple parity disks. The capacity object can also be divided into multiple segments.

In this specification, a disk is "out-of-sync" if the disk needs to be resynchronized. For example, an out-of-sync disk could be a disk that went offline for a period of time and has come back online. As a result, it is possible that the disk has stale or incorrect data, and therefore the disk needs to be resynchronized. As another example, an out-of-sync disk could be a disk for which an issue has been discovered with the data on the disk; e.g., the storage system discovered that a segment summary of the disk does not match the data of the corresponding segment of the disk, and therefore the disk needs to be resynchronized. As another example, an out-of-sync disk could be a disk for which the data on the disk has been lost completely, and therefore the disk needs to be resynchronized to recover the entire disk information.

In this specification, a first disk is "unavailable" if the disk cannot be used by a resynchronization system to resynchronize a second disk; that is, the first disk is "unavailable" to the resynchronization system. For example, an unavailable disk could be a disk that is out-of-sync; that is, a first disk that has unsynchronized data cannot be used to resynchronize a second disk. As another example, an unavailable disk could be a disk that is currently offline. In this specification, a disk is "available" if the disk is not "unavailable."

When one or more disks of the capacity object are unavailable, the storage system can maintain fault tolerance by identifying additional available disks and expanding the capacity object to include the additional disks. That is, if the capacity object is configured to maintain N disks and one or more of the original disks become unavailable, the system can identify N available disks and write all new data to the N identified disks while the one or more original disks are unavailable. In some cases, the N identified available disks can include one or more disks that were already in the capacity object; for example, if two out of six original disks of the capacity object are unavailable, the system can identify two additional disks that, along with the four original disks of the capacity object that are still available, can be used by the storage system while the two unavailable disks are being resynchronized.

After each of the original disks of the capacity object are again made available (for example, after a disk that had been out-of-sync has been resynchronized), the storage system can take one or more measures to "clean up" the capacity object and return the capacity object to its original size. That is, because the capacity object was expanded in response to the unavailability of one or more original disks, the capacity object might be overprovisioned when the unavailable disks come back online. Thus, the system can reduce the capacity object back to its original size, as the extra provisioning is no longer necessary. For example, the system might change a threshold for executing garbage collection, so that the system can free storage space more quickly. As another example, the system might flag the disks that had been added to the storage system as "read-only" so that new data is not written to the additional disks. The system might also identify the additional disks as preferred candidates for garbage collection and, when the additional disks have been completely freed, remove the additional disks from the capacity object.

Particular embodiments of the subject matter described in this specification can be implemented so as to realize one or more of the following advantages.

Using techniques described in this specification, a storage system can exclusively, or almost exclusively, perform full-stripe writes to an array of primary and parity disks, e.g., a RAID-6 array. Compared to performing single-block writes, full-stripe writes can reduce latency of the storage system and can be significantly more computationally efficient.

Using techniques described in this specification, a storage system can write data to a RAID-6 array without having to perform a second write for a checksum of the data. Instead, the storage system can create, using the same write request that writes the data to the RAID-6 array, a segment summary that can be used to verify the correctness of the data.

By expanding the capacity object when one or more original disks of a capacity object are unavailable, a storage system can maintain fault tolerance even while the original disks are unavailable. In some conventional systems, new data is simply written to the remaining original disks of the capacity object, and the new writes are propagated to the unavailable disks during the resynchronization process. However, this practice leaves the system vulnerable to failure, as the system has limited fault tolerance (or no fault tolerance at all) because of the unavailability of one or more of the original disks. Using techniques described in this specification, the system can add additional disks to the capacity object so that the system is still protected against disk failure. As a particular example, if two disks are unavailable in a RAID-6 array of six disks, then the array has no fault tolerance while the two disks are offline; however, if the system adds two additional disks to the array, then the system can still enjoy a fault tolerance of two disks while the unavailable disks are being repaired.

Writing new data to the additional disks also increases the read speed of the capacity object. In some conventional systems, when one or more disks are unavailable and new data is written to the remaining disks, reading the new data that would have been stored in the unavailable disks is greatly delayed, as it can require reading data from the remaining disks and solving for the requested data. As a particular example, if disk A of a RAID-6 array is unavailable and a user requests to retrieve data from a segment of disk A, then the storage system must read the data corresponding to the segment from disks B, C, D, and one of the parity disks P or Q in order to reconstruct the requested data. Thus, a single read request requires 4× more read commands. However, using techniques described in this specification, a system can write new data to the additional disks of the capacity objects so when a read request for the new data is received, the data can be retrieved directly from the additional disks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for maintaining fault tolerance for new writes in a storage system when one or more components of the storage system are unavailable.

Figure 1:
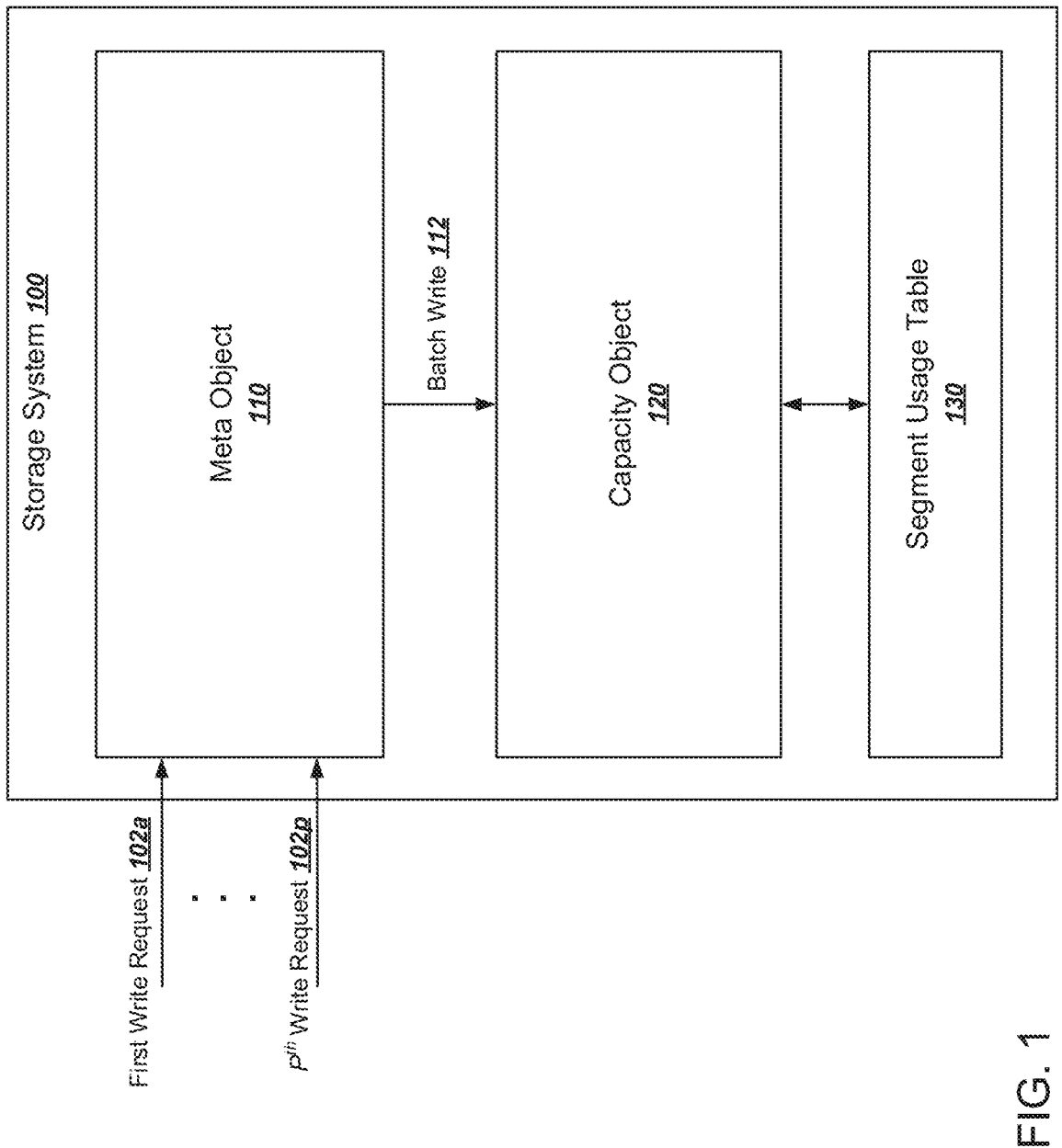
FIG. 1 is a diagram of an example storage system.

FIG. 1 is a diagram of an example storage system 100. The storage system 100 includes a meta object 110, a capacity object 120, and a segment usage table 130.

The storage system 100 is configured to receive requests to write data to the storage system 100. For example, the storage system might receive p write requests 102$a$-$p$, each associated with a different piece of data that is to be stored in the storage system 100. The write requests 120$a$-$p$ can be received from a computing device, e.g., from a user device or from a virtual machine on behalf of a user or user system.

Each time the storage system 100 receives a write request 102$i$, the data associated with the write request 102$i$ is written to the meta object 110, e.g., into a RAID-1 array in the meta object 110. When the amount of data that has been written to the meta object 110, cumulatively over one or more different write requests, surpasses a particular threshold, then the meta object can execute a batch write 112 to the capacity object that includes all of the data that has been written to the meta object 110 since the previous batch write 112. That is, the meta object 110 sends all of the data it has received across one or more write requests 102$a$-$p$ to the capacity object 120. In some cases, the meta object 110 can then erase the data in order to receive more write requests 102$i$. Typically the capacity object 120 is significantly larger than the meta object 110, e.g., 10×, 100×, or 1000× as large. Meta objects are discussed in more detail below in reference to FIG. 2.

The capacity object 120 can receive the batch write 112 and write the data for long-term storage, e.g., write the data to a RAID-6 array in the capacity object. The batch write 112 can be a full-stripe write to the RAID-6 array in the capacity object. If the batch write 112 includes new data that is to replace older data that is already stored in the capacity object 120, the capacity object 120 can execute a new full-stripe write and update a logical map that identifies the current location of every stored data item, instead of executing one or more single-block writes to overwrite the older data. Capacity objects are discussed in more detail below in reference to FIG. 3.

The capacity object 120 can include multiple "segments." That is, each disk of the capacity object 120 can be segmented into blocks of consecutive addresses, with corresponding blocks in each disk constituting a segment of the capacity object 120. When the capacity object 120 executes the batch write 112, some of the data in the batch write 112 might replace older data that is stored in other segments of the capacity object 120. After the capacity object 120 executes the batch write 112 and updates the logical map, the older data in the other segments is considered "stale." Stale data is data that has since been replaced with newer data in the logical map but that has not yet been erased or overwritten. Conversely, "live" data is data that is still in use, i.e., that still represents the latest version of the data.

The segment usage table 130 can track how much data in each segment of the capacity object 120 is live and how much is stale. That is, for each segment in the capacity object 120, the segment usage table 130 can identify i) how much of the data is still being used by the system that submits the write requests 120a-p, and ii) how much of the data has since been replaced with newer data stored in another segment. Segment usage tables are discussed in more detail below in reference to FIG. 4.

Figure 2:
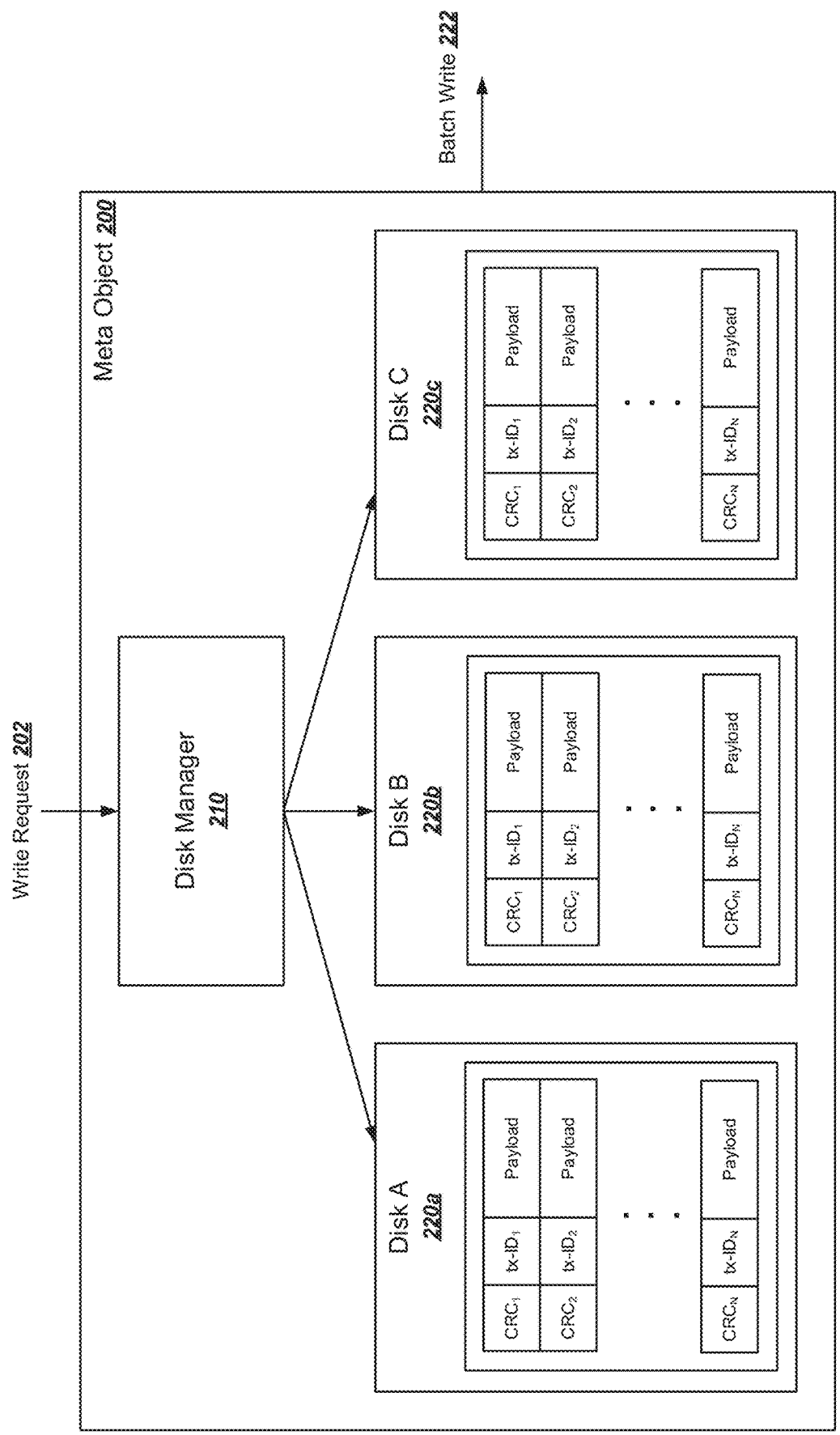
FIG. 2 is a diagram of an example meta object.

FIG. 2 is a diagram of an example meta object 200. The meta object 200 can be part of a storage system, e.g., the storage system 100 shown in FIG. 1, that includes the meta object 200 and a capacity object. The meta object 200 includes a disk manager 210 and three disks 220a-c. In some implementations, the three disks 220a-c are mirrored disks that make up a RAID-1 array.

The meta object 200 is configured to receive a write request 202 to write data to the storage system. The disk manager 210 can write the data to each of the disks 220a-c. This provides redundancy so that if any two of the disks fail, the meta object 200 can still recover the data. Moreover, the meta object 200 can resynchronize the failed disk when it comes back online.

Each time the disk manager 210 writes data to the disks 220a-c, the disk manager can write a copy of the same meta data block to each disk 220a-c, e.g., copies 224a-c of meta data block 224. Each meta data block can include a data integrity check, a transaction ID, and the data payload itself. The meta object 200 can use the data integrity check (e.g., a checksum value such as a cyclic redundancy check (CRC) value, a hash value, or a data fingerprint value) to ensure that the payload has not been corrupted. The transaction ID can identify the time at which the disk manager 210 wrote the data to the disk; that is, transaction IDs can be strictly increasing with time. The data payload can include the data that is associated with the write request 202.

When the meta object 200 receives a cumulative amount of data, across one or more write requests 202, that exceeds a particular threshold, then the meta object 200 can execute a batch write 222 to the capacity object of the storage system, sending each meta data block stored in the meta object 200 to the capacity object. In some implementations, the meta object 200 can perform one or more integrity checks on the data before performing the batch write 222. For example, the meta object 200 can determine, for each meta data block, whether the data stored in the three disks 220a-c is the same. As another example, the meta object 200 can determine, for each meta data block, if the data integrity check of the meta data block matches the associated data payload.

After sending the batch write 222 to the capacity object, the meta object 200 can free the storage space formerly used to store the corresponding meta data blocks of the batch write 222 to write new data associated with new write requests 202. For example, the meta object 200 can delete the corresponding meta data blocks from the three disks 220a-c. As another example, the meta object 200 can mark the corresponding meta data blocks as available to be overwritten by new data.

Figure 3A:
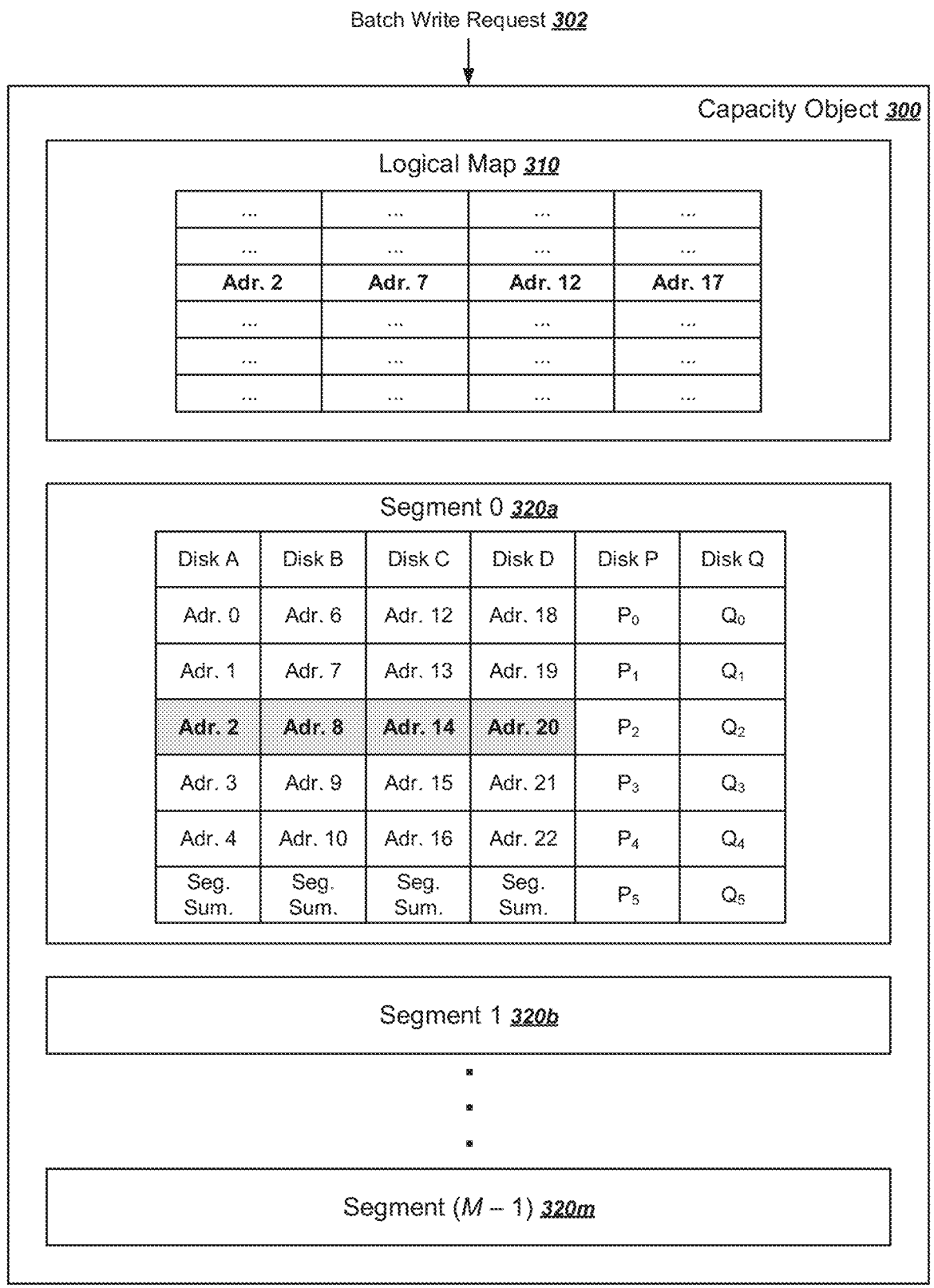
FIGS. 3A and 3B are diagrams of an example capacity object.
Figure 3B:
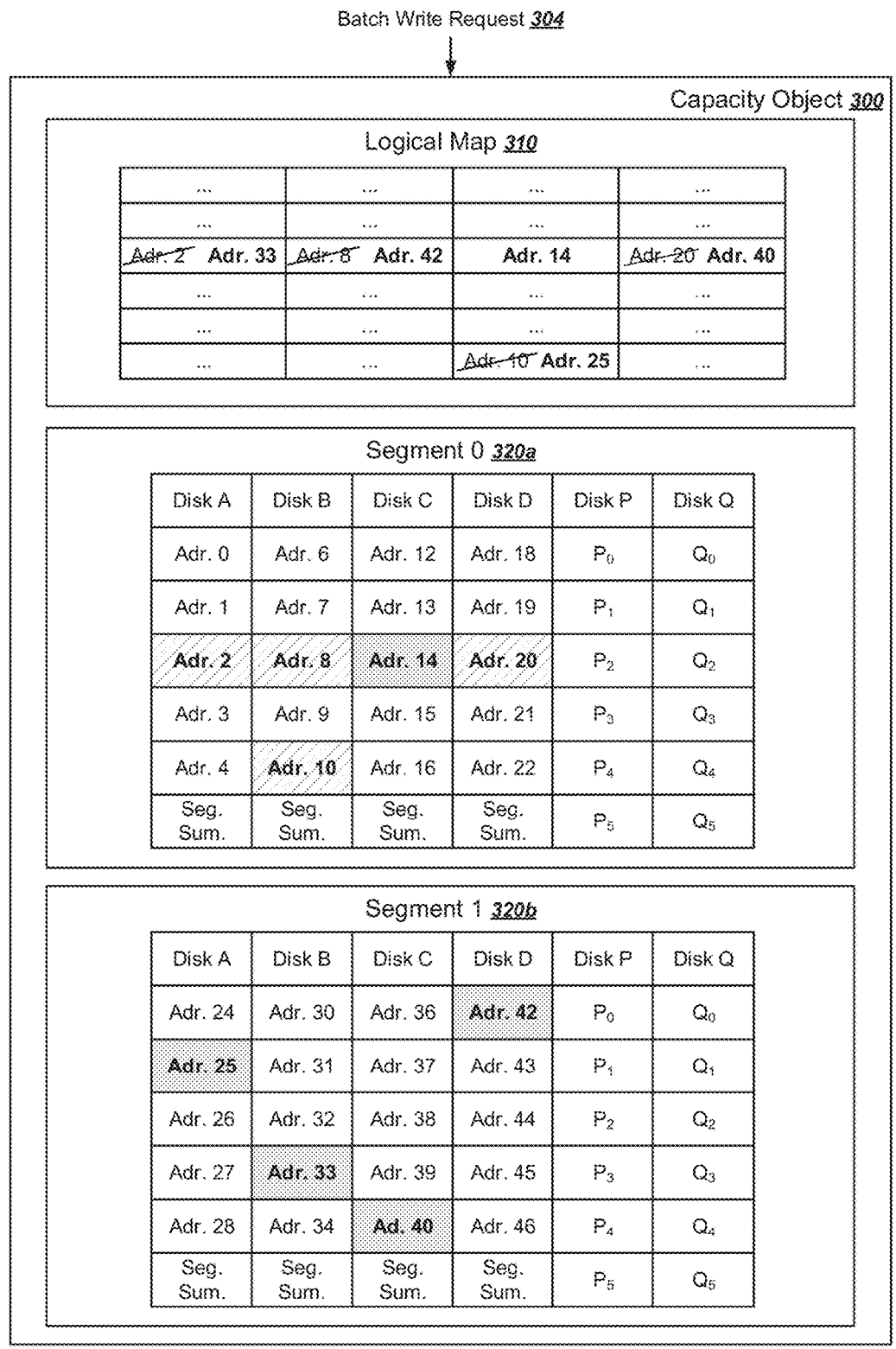

FIGS. 3A and 3B are diagrams of an example capacity object 300. The capacity object 300 can be part of a storage system, e.g., the storage system 100 depicted in FIG. 1, that includes a meta object and the capacity object 300.

The capacity object 300 includes a logical map 310 and M segments 320a-m. In the example shown in FIGS. 3A and 3B, the M segments 320a-m are segments of six disks in a RAID-6 array, where four of the six disks (disks A, B, C, and D) are primary disks and two of the six disks (disks P and Q) are parity disks. That is, each segment 320i represents a list of consecutive addresses of the six disks. As a particular example, each segment can include 768 KB total storage space, including 128 KB in each of the six disks. In this example, each segment has 512 KB of usable storage space, i.e., 128 KB in each of the primary disks.

In some implementations, the four of the six disks that are used as primary disks and the two of the six disks that are used as parity disks are "cycled" in each segment of the capacity object 300. That is, the capacity object 300 can use a portion of a disk corresponding to a first segment to store primary data, and a different portion of the same disk corresponding to a second segment to store parity data. In some other implementations, the capacity object 300 can use the same four disks as primary disks and the same two disks as parity disks for all segments of the capacity object 300.

As illustrated in the example of FIG. 3A, the capacity object 300 is configured to receive a batch write request 302 to store data in the capacity object 300. For example, the batch write request 302 can come from a meta object of the storage system of the capacity object 300, e.g., the meta object 200 depicted in FIG. 2. In some implementations, each batch write request includes the same amount of data as can be stored in a single segment 320i; that is, the stripe size of the capacity object 300 is equal to the size of a segment 320a-m. In some other implementations, each batch write request includes the same amount of data as can be stored in one stripe of a segment 320i; that is, the stripe size of the capacity object 300 is less than the size of a segment 320a-m. In any case, the capacity object 300 can be configured to receive batch write requests that represent full-stripe writes, which, as discussed above, is more efficient than writing to individual blocks of respective disks of a segment.

Upon receiving the batch write request 302, the capacity object 300 can determine the segment to which to write the data associated with the batch write request 302. For example, the capacity object 300 can use a segment usage table that identifies which segments are available to receive new data. Segment usage tables are discussed in more detail below in reference to FIG. 4.

In the example illustrated in FIG. 3A, the capacity object 300 can determine to write the data to the first segment 320a. That is, the capacity object 300 can place the data associated with the batch write request 302 into the storage addresses of the first segment 320a. As a particular example, segments 0 through (M−1) could all be empty, and thus the capacity object 300 chose the first available segment, namely the first segment 320a. As another particular example, the first segment 320a could be completely or partially available after the first segment 320a was reclaimed through garbage collection; that is, a garbage collection system of the capacity object 300 could have determined that the data in the first segment 320a was stale, and removed the stale data or marked it as available to be overwritten.

In some implementations, the capacity object 300 places the data into a physical storage space corresponding to segment 320a. In some other implementations, the first segment 320a is itself a virtual storage space managed by a lower-level system, and so the capacity object 300 provides the data to the lower-level system that manages the corresponding physical storage space. While only five stripes of the first segment 320a are illustrated in FIG. 3A, in practice the first segment 320a can have many more stripes.

In some implementations, when the capacity object 300 places the data into the first segment 320a, the capacity object 300 can also compute the values for the parity disks P and Q. That is, the batch write request 302 can include only the primary data that is to be placed into disks A, B, C, and D, which the capacity object 300 can process to determine the parity values that are to be placed into disks P and Q. In some other implementations, the batch write request 302 includes the parity values to be stored in disks P and Q.

The capacity object 300 can further generate a segment summary for each disk. The segment summary for a primary disk describes the data that is in the portion of the primary disk corresponding to the segment. For example, the segment summary can include a data integrity check, e.g., a CRC value, a hash of the data in the segment, a size of the segment, etc. Typically, this metadata takes up a small amount of space compared to the segment itself, e.g. 0.1%, 0.5%, 1%, 5%, 10%, or 20% of the storage space. In the implementations in which the stripe size of the capacity object 300 is equal to the size of each segment 320a-m, the capacity object 300 can compute the segment summaries of a particular segment each time the capacity object 300 executes a full-stripe write to the particular segment. In the implementations in which the stripe size of the capacity object 300 is less than the size of each segment 320a-m, the capacity object 300 can re-compute the segment summaries of a particular segment each time the capacity object 300 executes a full-stripe write to the particular segment, using the data in each of the stripes of the segment. The segment summary for a parity disk can be the parity values calculated from the segment summaries of the primary disks. The segment summaries of a particular segment can be stored in addresses of the particular segment; for example, as depicted in FIG. 3A, the segment summaries are stored in Addresses 5, 11, 17, and 23 of the first segment 320a.

The logical map 310 characterizes, for each piece of data included in the batch write requests received by the capacity object 300, the location of the piece of data in a respective segment of the capacity object 300. In the example depicted in FIGS. 3A and 3B, there is a single logical map 310 that applies to every segment 320a-m in the capacity object 300. In some implementations, the logical map 310 is stored in 'logical map pages' of the capacity object 300. In some other implementations, the logical map 310 is stored in a meta object of the storage system of the capacity object 300.

The logical map 310 is a map between i) the logical addresses of the capacity object 300, i.e., the addresses that are exposed to a system that retrieves data from the capacity object 300, and ii) the physical addresses of the segments of the capacity object 300. As noted above, in some implementations, the physical addresses of the capacity object 300 are themselves logical addresses of a lower-level system that manages the actual physical machines that store the data. For clarity, the logical map 310 in FIGS. 3A and 3B is depicted as a table; however, in general the logical map 310 can be stored as any indexing structure that can map the logical addresses of the capacity object 300 to physical addresses. As a particular example, the logical map 310 can be stores as a B-tree.

Thus, when a batch write 302 includes new data that is to replace existing data that is already being stored in the capacity object 300, the capacity object does not have to execute a single-block write to the physical addresses of the segment 320i that is currently storing the existing data, which can be computationally expensive. Instead, the capacity object 300 can execute a full-stripe write of all of the data in the batch write request 302 to a new segment of the capacity object 300, and simply update the logical map 310 to list the new location of the data instead of the existing location of the data.

In the example illustrated in FIG. 3A, all of the data in the batch write request 302 is new data—that is, the data in the batch write request 302 is not replacing data that is already stored in the capacity object 300. Therefore, the capacity object can generate new entries in the logical map 310 that identify where the new data is located in the capacity object 300. In particular, the capacity object 300 can execute a full-stripe write that writes new data to the physical addresses 2, 8, 14, and 20 of the first segment 320a, and generate entries in the logical map 310 that map the logical addresses of the new data to those addresses.

In some implementations, e.g., in the implementations in which the stripe size of the capacity object 300 is equal to the size of each segment 320a-m, the capacity object 300 executes a full-stripe write to the entire first segment 320a, i.e., writing to each address 0 through 22.

In some implementations in which the stripe size of the capacity object 300 is less than the size of each segment 320a-m, the capacity object 300 executes full-stripe writes in chronological order of the stripes in a segment. That is, when the capacity object 300 executes the full-stripe write to the stripe composed of addresses 2, 8, 14, and 20, the first segment 320a includes live data in the stripe composed of addresses 1, 7, 13, and 19 but does not include live data in the stripe composed of addresses 3, 9, 15, and 21. Then, when the capacity object 300 receives a new batch write request 302, the capacity object 300 might write to the stripe composed of addresses 3, 9, 15, and 21.

In some other implementations in which the stripe size of the capacity object 300 is less than the size of each segment 320a-m, the capacity object 300 does not necessarily execute full-stripe writes in chronological order of the stripes in a segment. That is, when the capacity object 300 executes the full-stripe write to the stripe composed of addresses 2, 8, 14, and 20, the first segment 320a might not include live data in the stripe composed of addresses 1, 7, 13, and 19, and/or might include live data in the stripe composed of addresses 3, 9, 15, and 21. For example, if the first segment 320a was partially reclaimed by a garbage collection system if the capacity object 300, the stripe composed of addresses 2, 8, 14, and 20, might have been reclaimed and thus does not include any live data, but the stripe composed of addresses 3, 9, 15, and 21 might not have been reclaimed and thus does include live data.

As depicted FIG. 3B, the capacity object 300 can receive another batch write request 304. As before, the capacity object 300 can determine the segment to which to write the data associated with the batch write request 304. In the example illustrated in FIG. 3B, the capacity object 300 can determine to write the data to the second segment 320b. Note that, in general, the capacity object 300 does not have to write to segments sequentially; that is, the capacity object 300 could have written to any segment of the capacity object 300 after writing to the first segment 320a.

In the example illustrated in FIG. 3B, the batch write request 304 includes four blocks of data that are to replace existing blocks of data. Namely, the batch write request 304 includes three blocks of data that are to replace the data of batch write request 302 previously written to addresses 2, 8, and 20. Additionally, the batch write request 304 includes a block of data that is to replace data previously written to address 10 in the first segment 320a.

Therefore, when the capacity object 300 writes the data associated with the batch write request 304 to the second segment 320b, the capacity object 300 also updates the logical map 310 to identify the four new locations for the new blocks of data that replace the existing blocks of data. Namely, the logical map now identifies the addresses 33, 42, 25, and 40 of the second segment 320b as the new location for the four blocks of data, replacing the addresses 2, 8, 10, and 20 of the first segment 320a. The data stored in addresses 2, 8, 10, and 20 of the first segment 320a is not erased or overwritten in the example depicted in FIG. 3B; rather, it simply become "stale." The capacity object 300 might track the fact that these addresses have become stale in a segment usage table of the capacity object 300. Segment usage tables are discusses in more detail below in reference to FIG. 4.

Note that the new data does not have to be stored sequentially in the second segment 320b, even though it may be sequential in the logical map 310. That is, the new data can be only a portion of the data in the batch write request 304, so that the capacity object 300 can write other data in between the new data (e.g., data in addresses 34, 36, etc. between addresses 33 and 42 even though addresses 33 and 42 are sequential in the logical map 310).

Note also that the new data does not have to be written to the same disk as the stale data that is replaces (e.g., the data that replaces address 2 of Disk A is written to address 33 of Disk B).

Executing the batch write request 304 in the way described above can be much more efficient than individually overwriting each stale piece of data in the first segment 320a with the corresponding new piece of data. For example, overwriting the data in address 10 of the first segment would require the capacity object 300 to read the full corresponding stripe between address 4 and $Q_4$, compute new parity values for $P_4$ and $Q_4$ using the new data, and rewrite the stripe. Additionally, the capacity object 300 might have to read, update, and rewrite the segment summary of Disk B to reflect the new value in address 10. Using the technique described above, the capacity object 300 can write the new data in a single full-stripe write, and simply update the logical map 310 to reflect the change.

After the capacity object 300 updates the logical map 310 and executes the batch write request 304, if an external system submits a request to retrieve the four updated blocks of data, the capacity object 300 can determine, from the logical map 310, the locations of the most recent versions of the data (namely, addresses 33, 42, 25, and 40 of the second segment 320b) and retrieve the data from the determined locations.

Figure 4:
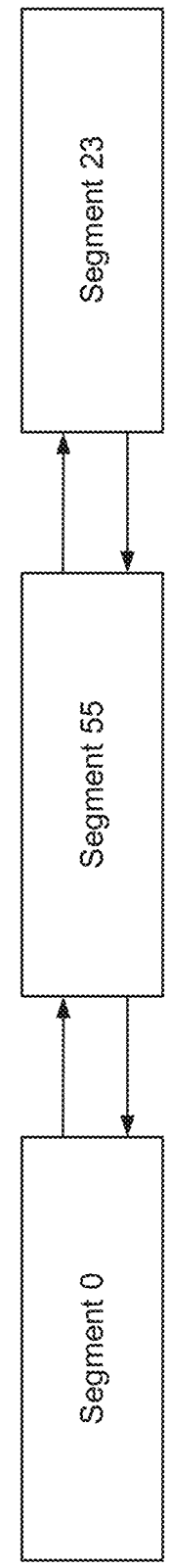
FIG. 4 is a diagram of an example segment usage table.

FIG. 4 is a diagram of an example segment usage table 400. The segment usage table 400 can be part of a storage system, e.g., the storage system 100 depicted in FIG. 1, that includes a meta object and a capacity object, where the availability of the respective segments of the capacity object is characterized by the segment usage table 400.

The segment usage table 400 includes a row for each segment of the capacity object of the storage system. The row corresponding to a particular segment can identify whether or not the segment currently has "live" data, i.e., data that has not since been updated in a more recent write to a later segment in the linked list of segments of the capacity object. While the segment usage table 400 uses a linked list to track the segments that are currently in use, in general a segment usage table can use any suitable data structure.

For each segment, the corresponding row in the segment usage table 400 lists i) a previous segment in a linked list of segments 410, ii) a next segment in the linked list of segments 410, iii) a number of live blocks, and iv) a transaction ID. The linked list of segments 410 includes every segment that currently stores live data. In some implementations, the linked list is a doubly-linked list, i.e., each segment in the linked list has a reference to both the "previous" and the "next" segment in the linked list, as depicted in FIG. 4. In some other implementations, the linked list is a singly-linked list, i.e., each segment in the linked list has a reference to only the "next" segment in the linked list.

In the example illustrated in FIG. 4, there are three segments of the capacity object corresponding to the segment usage table 400 that have live data: segment 0, segment 55, and segment 23. The "Num. Live Blocks" value for each segment in the linked list of segments 410 identifies the number of blocks in the segment that have live data; namely, segment 0 has 83 live blocks, segment 23 has 102 live blocks, and segment 55 has 40 live blocks. The "Transaction ID" value for each segment identifies the time at which the segment was most recently written to, i.e., how old the newest data in the segment is. Generally, because the storage system generally executes full-stripe writes to segments, the newest data in a segment is the data in the final stripe of the segment. The transaction IDs in the linked list of segments 410 are strictly increasing, because the linked list 410 defines the order in which the segments have been written to; therefore, the transaction ID of segment 0 is smaller than the transaction ID of segment 55, which is smaller than the transaction ID of segment 23.

When the capacity object receives a new write request associated with new data, the capacity object can use the segment usage table 400 to identify the segment in which to store the new data. For example, e.g., in storage systems where the stripe size is equal to the size of each segment, the capacity object can select a segment that is not currently in the linked list of segments 410, i.e., a segment that currently does not have any live blocks. In the example illustrated in FIG. 4, the $M^{th}$ segment (segment M−1) is not in the linked list and therefore has 0 live blocks. As a result, the capacity object can write the new data to segment M and add segment M to the linked list 410, e.g., to the end of the linked list (i.e., after segment 23).

As another example, e.g., in storage systems where the stripe size is smaller than the size of each segment, the capacity object can select a segment that is already in the linked list of segments (i.e., that has one or more live blocks) and that has more available blocks than are needed to store the new data, and write the new data to the selected segment. Generally, the selected segment includes full stripes of data that are available (i.e., full stripes that include no live data), and so the capacity object executes full-stripe writes of the new data to the selected segment. In this case, the capacity object can update the number of live blocks in the selected segment, and reorder the linked list 410 to reflect the fact that the selected segment is the most recent segment to have been updated; that is, if the selected segment was not the final segment in the linked list before writing the new data, then the capacity object can place the selected segment at the end of the linked list.

The segment usage table 400 in FIG. 4 includes data identifying every segment in the corresponding capacity object, including segments that have live data and therefore are in the linked list of segments and segments that do not have live data and therefore are not in the linked list of segments (e.g., segment M–1). In some other implementations, the segment usage table can only include data identifying segments that have live data, i.e., only include segments that are in the linked list of segments. In these implementations, the storage system can maintain a separate table that lists the segments of the capacity object that do not have live data, i.e., that are not yet in the linked list. Then, when the capacity object write data to one of the segments that are not yet in the linked list, the capacity object can remove the segment from the table listing segments that do not have live data, and add the segment to the segment usage table that tracks segments that do have live data.

In some implementations, the storage system stores the logical map 400 in the meta object of the storage system. In some other implementations, the storage system stores the logical map 400 in the capacity object of the storage system. In some other implementations, the storage system stores the logical map 400 separately from both the meta object and the capacity object of the storage system.

Figure 5:
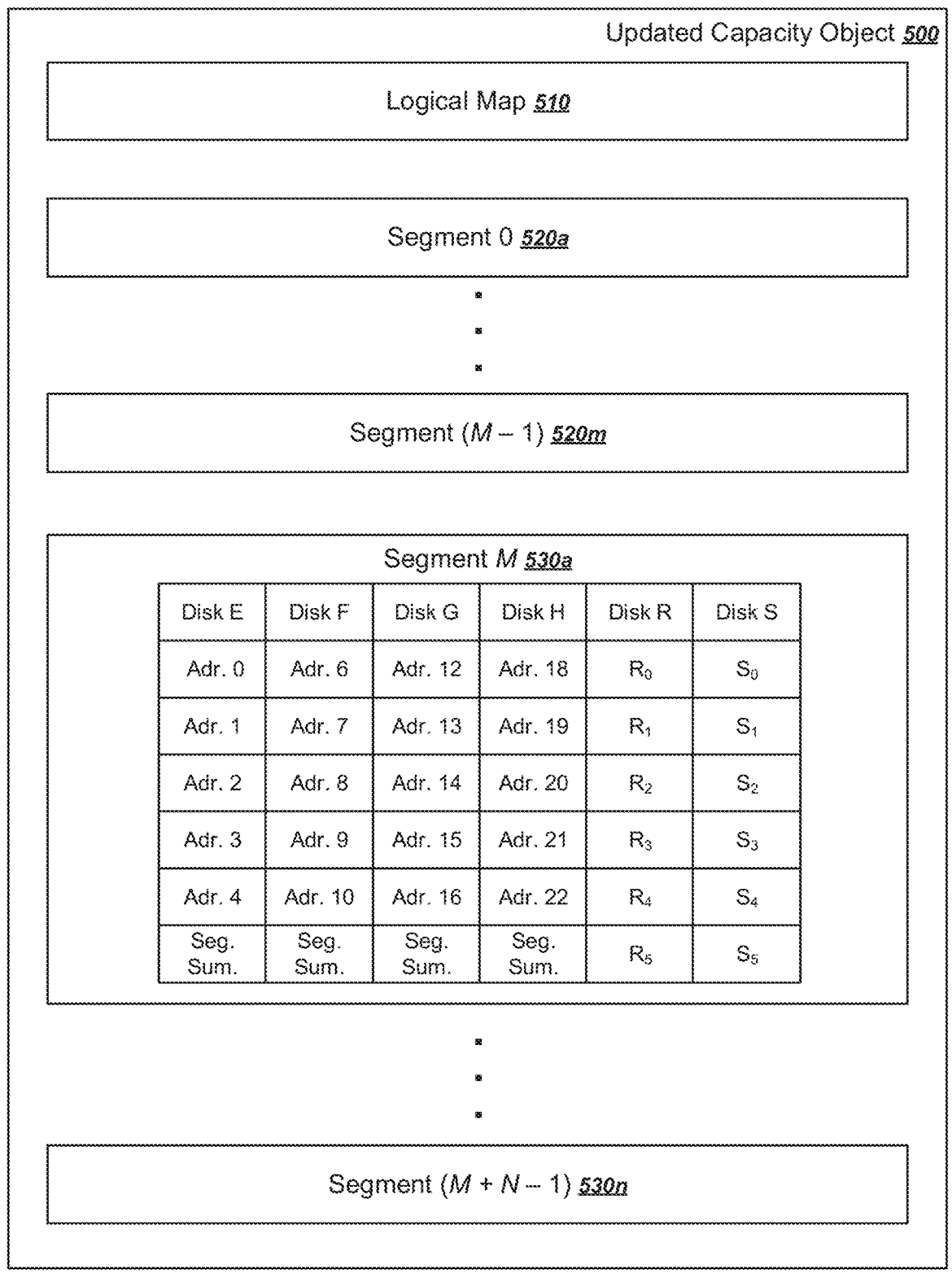
FIG. 5 is a diagram of an example capacity object that has been updated in response to one or more disks becoming unavailable.

FIG. 5 is a diagram of an example capacity object 500 that has been updated in response to one or more disks of the capacity object becoming unavailable. The capacity object 500 can be part of a storage system, e.g., the storage system 100 depicted in FIG. 1, that includes a meta object and the capacity object 300. The capacity object 500 might be the capacity object 300 depicted in FIGS. 3A and 3B, after the capacity object 300 has been updated in response to one or more of the disks A, B, C, D, P, or Q becoming unavailable.

As described above, the storage system of the capacity object 500 can also include a logical map 510, which is a map between i) the logical addresses of the capacity object 500 and ii) the physical addresses of the segments of the capacity object 500 (which may themselves be logical addresses of a lower-level system that manages the physical machines of the storages system). That is, the logical map 510 characterizes, for each piece of data stored in the capacity object 500, the location of the piece of data in a respective segment of the capacity object 500.

The capacity object 500 includes M original segments 520a-m. In the example shown in FIG. 5, the M original segments 520a-m are segments of six disks in a RAID-6 array, where four of the six disks (disks A, B, C, and D) are primary disks and two of the six disks (disks P and Q) are parity disks.

One or more disks of the original disks of the capacity object 500, corresponding to the original segments 520a-m, are currently unavailable. For simplicity, the unavailable disks will be called "first" disks. For example, the one or more first disks might be offline or out-of-sync. In response, the storage system updates the capacity object 500 to include N additional segments 530a-n. While the one or more first disks are being repaired (e.g., while the storage system performs a resynchronization process on the first disks), the capacity object 500 will store the data corresponding to each new write request in one of the N additional segments 530a-n.

The N additional segments 530a-n include six disks: four primary disks E, F, G, and H, and two parity disks R and S. For simplicity, the six disks corresponding to the additional segments 530a-n will be called "second" disks. Each second disk is currently available, and therefore the capacity object 500 can execute writes to the second disks while the one or more first disks are being repaired.

In some implementations, the second disks E, F, G, H, R, and S are all new to the capacity object 500. That is, there is no overlap between the second disks and the original disks A, B, C, D, P, and Q of the capacity object 500.

In some other implementations, one or more of the second disks can be the same disk as an original disk of the capacity object 500 that is currently available. As a particular example, if disks A and B are currently unavailable, then the storage system might identify new disks E and F to add to the capacity object 500, and determine the remaining second disks (i.e., disks G, H, R, and S) to be the original disks of the capacity object 500 that are still available (i.e., disks C, D, P, and Q).

As described above, in some implementations, the subset of second disks that are used as primary disks and the subset of second disks that are used as parity disks can be "cycled" in each additional segment 530a-n of the capacity object 300. To continue the above example where original disks A and B of the capacity object 500 are replaced by new disks E and F, in a subset of the additional segments 530a-n the new disks E and F might be used as parity disks instead of primary disks.

Augmenting the capacity object 500 to include the additional segments 530a-n corresponding to the second disks can include adding the address spaces of the additional segments 530a-n to a list of available storage space of the capacity object 500. For example, the storage system can add data characterizing the additional segments 530a-n to a segment usage table of the storage system. This process is described in more detail below with reference to FIG. 6.

When the capacity object 500 receives a new batch write request 502 (e.g., from a meta object of the storage system), the capacity object 500 can select to write the data associated with the batch write request 502 to one of the additional segments 530a-n. For example, the capacity object might determine to write the new data to the first segment 530a of the N additional segments. In other words, the capacity object 500 will not write any new data to the original segments 520a-m because one or more of the disks of the original segments 520a-m (i.e., the one or more first disks) are unavailable, and therefore the original segments 520a-m do not enjoy the full fault tolerance required by the storage system.

As a particular example, the original segments 520a-m might be tagged in a segment usage table as "read-only", while the additional segments 530a-n are not tagged as "read-only", so that the capacity object 500 can identify which segments are available to execute new writes. This process is described in more detail below with respect to FIG. 6.

As described above, when writing to the additional segments 530a-n, the capacity object 500 can update the logical map 510 to identify the location of each new item of data. The capacity object can also determine the parity values of the new data to store in the parity disks R and S, as well as segment summaries for each primary disk E, F, G, and H.

In some cases, the capacity object 500 might add new additional segments multiple times while the first disks are being repaired. That is, the additional segments 530a-n might be filled with new data before the first disks are available again, and so the capacity object 500 adds additional segments again. In some such cases, the capacity object 500 can use the same second disks E, F, G, H, R, and S when adding more additional segments. In some other such cases, the capacity object 500 can identify new second disks that are different from the second disks E, F, G, H, R, and S and add the new second disks to the capacity object 500.

In some implementations, when the one or more first disks become available again, the capacity object 500 can shrink back down to its original size, i.e., remove the additional segments 530a-n. Some example techniques for cleaning an over-provisioned capacity object are described below with respect to FIG. 7.

Figure 6:
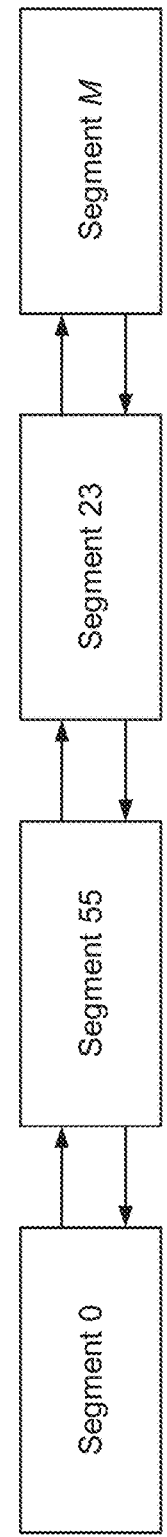
FIG. 6 is a diagram of an example segment usage table that has been updated in response to one or more disks becoming unavailable.

FIG. 6 is a diagram of an example segment usage table 600 that has been updated in response to one or more disks of a corresponding capacity object becoming unavailable. The segment usage table 600 can be part of a storage system, e.g., the storage system 100 depicted in FIG. 1, that includes a meta object and the capacity object, where the availability of the respective segments of the capacity object is characterized by the segment usage table 600.

The segment usage table 600 might be the segment usage table 400 depicted in FIG. 4, after the segment usage table 400 is updated in response to one or more "first" disks of the original disks A, B, C, D, P, or Q becoming unavailable. As described above with respect to FIG. 5, the storage system augments the capacity object of the storage system with N additional segments corresponding to "second" disks E, F, G, H, R, and S. The second disks may or may not have overlap with the original disks; that is, one or more of the original disks that are still available can also be second disks.

As described above, the segment usage table 600 includes a row for each segment of the capacity object of the storage system. For each segment, the corresponding row in the segment usage table 600 lists i) a previous segment in a linked list of segments 610, ii) a next segment in the linked list of segments 610, iii) a number of live blocks, and iv) a transaction ID. The linked list of segments 610 includes every segment that currently stores live data. The first M rows of the segment usage table 600 characterize the M original segments of the capacity object that correspond to the original disks. The subsequent N rows of the segment usage table 600 characterize the N additional segments of the capacity object that correspond to the second disks and that have been added in response to the first disks becoming unavailable.

That is, when the capacity object adds the N additional segments, the storage system updates the segment usage table to include the N additional segments and initializes each additional segment to have zero live blocks.

The system also adds a "Read Only" field to the segment usage table 600 in response to the unavailability of the first disks. The "Read Only" identifies whether the respective segment is a read-only segment, i.e., whether or not new data should be written to the segment. Each of the M original segments are identified as read-only, while each of the N additional segments are identified as not read-only. Because the M original segments correspond to the unavailable first disks and therefore do not enjoy full fault tolerance, the storage system determines that new data should not be written to the original segments. On the other hand, the N additional segments correspond to the available second disks, and thus the storage system determines that new data may be written to the additional segments.

The "Read Only" field can also be used by a "segment cleaning" system that perform garbage collection on the capacity object. The segment cleaning system removes stale data that no longer needs to be stored, freeing space in the capacity object. In some implementations, the segment cleaning system only performs cleaning on the segments that are identified not read-only. That is, the read-only segments are not processed by the segment cleaning system, as the storage system will not write to the read-only segments anyway.

When the capacity object receives a new write request associated with new data, the capacity object can use the segment usage table 600 to identify a segment that i) has enough storage space to store the new data and ii) is not read-only. In the example illustrated in FIG. 6, the storage system has written new data to the first additional segment, segment M, and has added segment M to the linked list 610, e.g., to the end of the linked list after segment 23. As described above, in the example depicted in FIG. 6, the segment usage table 600 includes every segment in the capacity object, including segments that have live data and therefore are in the linked list of segments and segments that do not have live data and therefore are not in the linked list of segments. In some other implementations, the segment usage table can only include segments that have live data, i.e., only include segments that are in the linked list of segments.

Figure 7:
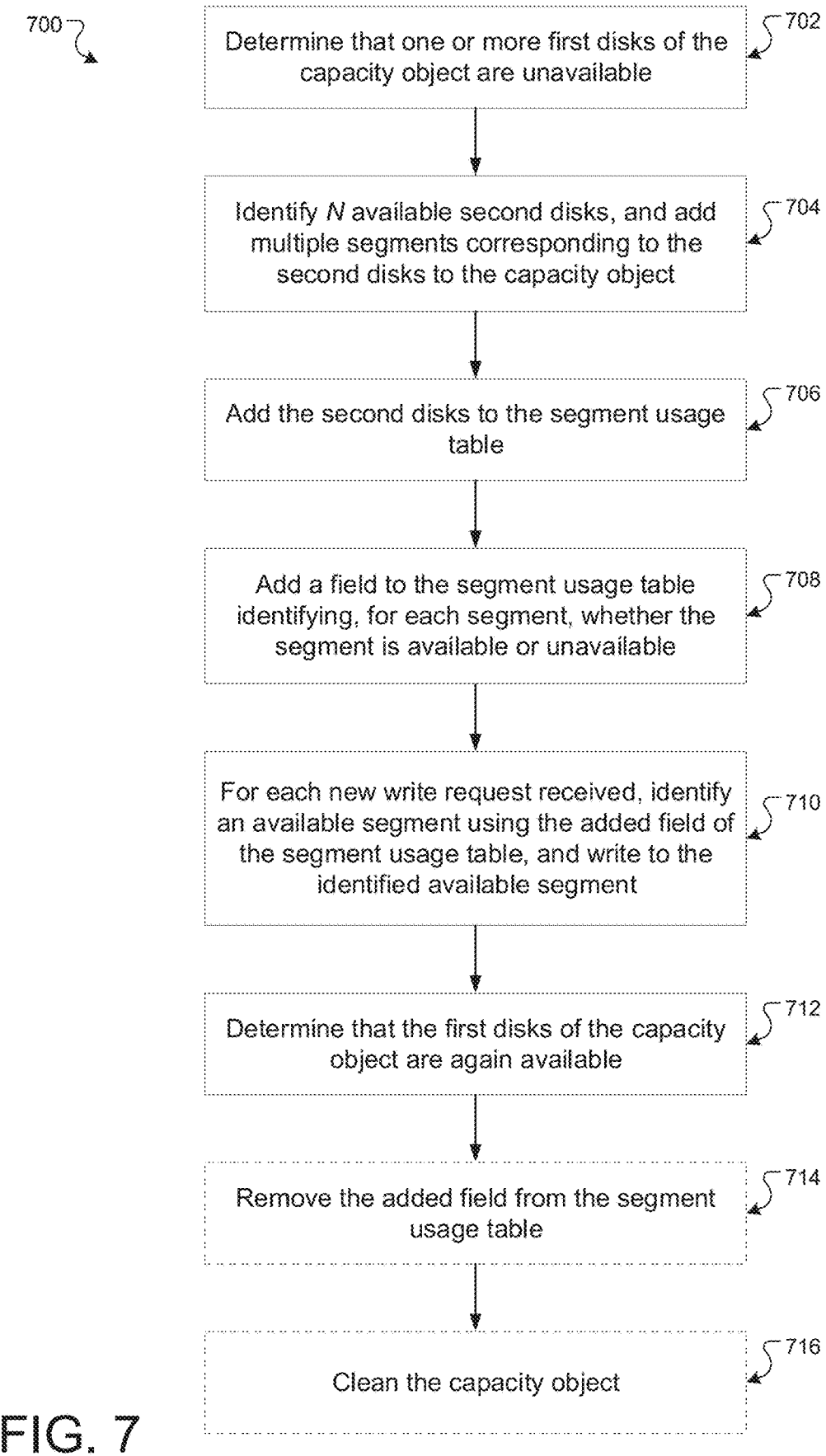
FIG. 7 is a flow diagram of an example process for maintaining fault tolerance for new writes in a storage system when one or more components of the storage system are unavailable.

FIG. 7 is a flow diagram of an example process 700 for maintaining fault tolerance for new writes in a storage system when one or more components of the storage system are unavailable. For convenience, the process 700 will be described as being performed by a system of one or more computers located in one or more locations. For example, a management system of a storage system, e.g., the storage system 100 depicted in FIG. 1, appropriately programmed in accordance with this specification, can perform the process 700.

Although the description below refers to "disks" of a storage system, the same method can generally be performed on any other fault domain, e.g., sites, racks, chassis, hosts, etc.

The storage system can include a capacity object, e.g., the capacity object 300 depicted in FIGS. 3A and 3B. The capacity object can include multiple primary disks and multiple parity disks. In some implementations, the capacity object is a RAID-6 array that includes four primary disks and two parity disks. As described above with reference to FIG. 3, the disks can be segmented into multiple segments, so that each segment includes, for each disk of the capacity object, a sequence of consecutive addresses of the disk. The amount of used and unused storage space in each segment of the capacity object can be tracked using a segment usage table, e.g., the segment usage table 400 depicted in FIG. 4.

The system determines that one or more first disks of the capacity object are unavailable (step 702). That is, one or more first disks of N original disks of the capacity object are offline, out-of-sync, or otherwise unavailable. The system can execute a repair process for the one or more first disks. While the repair process is being executed, the system can maintain the full fault tolerance of the storage system by adding additional disks and segments to the capacity system, as described below.

The system identifies N available second disks, and adds multiple segments corresponding to the second disks to the capacity object (step 704). In some implementations, one or more of the second disks can be original disks of the capacity object that are still available (i.e., original disks that are not one of the first disks).

The system adds the multiple segments corresponding to the N second disks to the segment usage table (step 706). The segment usage table can include one or more of: a previous segment in a linked list of segments that are currently in use, a next segment in the linked list of segments that are currently in use, or a transaction ID characterizing the time at which the segment was most recently updated (e.g., a timestamp).

The system adds a field to the segment usage table identifying, for each segment, whether the segment is available or unavailable (step 708). For each original segment of the capacity object corresponding to the original disks (and therefore corresponding to the unavailable first disks), the system identifies the segment as unavailable. For each additional segment of the capacity object corresponding to the second disks, the system identifies the segment as available. For example, the system might add a single bit, e.g., a "read-only" bit, to each element of the segment usage table.

The added field can also be used by a segment cleaning system that perform garbage collection on the capacity object. That is, the segment cleaning system only performs cleaning on the segments that are identified as available.

For each new write request associated with new data received by the capacity object, the system identifies an available segment using the added field of the segment usage table, and writes the new data to the identified available segment (step 710). That is, the system does not write any new data to the original disks that include the unavailable first disks, and instead write each new item of data to the available second disks. Thus, the new writes enjoy full fault tolerance.

The system determines that the first disks of the capacity object are again available (step 712). For example, the system can receive a notification from an external system that was executing a repair process on the first disks.

In some implementations, the system can determine that one or more original segments of the capacity object are again available. For example, the external system might repair the first disks incrementally by segment, and can notify the system when each segment is available. In these implementations, the system can update the added field corresponding to the newly-available original segment to reflect that the segment is again available, e.g., changing the field from "read-only" to "not read-only." Then, when each segment has been repaired (and thus the first disks have been repaired), the system can proceed to step 714.

In some implementations, the system removes the added field from the segment usage table (step 714). Since the first disks are again available, the segments corresponding to the first disks are also available, and therefore the added field is no longer necessary.

In some other implementations, the system updates the added field for each segment in the segment usage table to reflect that all of the segments of the capacity object are again available, e.g., changing each field from "read-only" to "not read-only." Removing the field from the segment usage table might be expensive in terms of time and/or computation, and so changing the field for each segment might be more efficient.

In some implementations, the system cleans the capacity object (step 716). That is, the capacity object might be overprovisioned because the capacity object was expanded in response to the unavailability of the first disks, and so the system might wish to return the capacity object to its original size.

For example, the system can call a segment cleaning system whenever an amount of available storage space falls below a certain threshold. The segment cleaning system can then erase stale data that no longer needs to be stored, freeing space in the capacity object. In order to accelerate the cleaning of the capacity object after the first disks come back online, the system can increase the threshold. By lowering the standard for calling the segment cleaning system, a relatively large amount of storage space can be available and the system will still determine to perform garbage collection.

For example, the threshold might represent a number of unused segments in the capacity object, and the system might increase the threshold by the same number of additional segments that were added to the capacity object in step 704. For example, if the original threshold is t and M additional segments were added to the capacity object, then the new threshold is t+M.

As another example, the system can identify the additional segments that were added to the capacity object in step 704 as "read-only" in the segment usage table. In some implementations, the system retains the "read-only" bit that was added to the segment usage table in step 708, except the system flips the bit for each segment so that the additional segments are identifies as read-only and the original segments are identified as not read-only. Thus, new data associated with write requests will not be written to the additional segments.

The system can also instruct the segment cleaning system to prioritize cleaning the segments that are identified in the segment usage table as read-only. That is, the segment cleaning system can be configured to clean segments identified as read-only if such segments are available to be cleaned (i.e., if there are read-only segments with stale data that meet the criteria for cleaning). Only if there are no read-only segments that meet the criteria to be cleaned does the segment cleaning system clean a non-read-only segment.

Once the additional segments have been fully cleaned, i.e., when all data stored in the additional segments has been freed, the system can remove the additional segments from the segment usage table, and remove the second disks from the capacity object. In some implementations, the system can remove the additional segments from the segment usage table incrementally, as they are freed. In some other implementations, the system waits until each additional segment has been freed before removing them from the segment usage table.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; solid state drives, NVMe devices, persistent memory devices, magnetic disks, e.g., internal hard disks or removable disks; magneto-optical disks; and CD-ROM and DVD-ROM and Blu-ray discs. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising:
a capacity object comprising a plurality of first disks, the plurality of first disks having a corresponding plurality of segments, wherein each segment comprises:
 a primary column corresponding to each of a plurality of primary disks, wherein each primary column comprises a plurality of primary storage blocks, and
 a parity column corresponding to each of a plurality of parity disks, wherein each parity column comprises a plurality of parity storage blocks;
a segment usage table identifying the plurality of segments of the capacity object, the segment usage table comprising, for each of the segments, data identifying an amount of used or unused storage space in the segment; and
a management system configured to perform operations comprising:
 determining that one or more of the first disks are unavailable and, in response:
  identifying a plurality of available second disks,
  adding a plurality of new segments corresponding to the second disks to the capacity object, and
  adding data identifying the plurality of new segments to the segment usage table; and
 for each of one or more new write requests to the capacity object:
  identifying an available segment from the plurality of new segments, and
  writing data associated with the new write request to the identified available segment.

Embodiment 2 is the system of embodiment 1, wherein the segment usage table includes a field that identifies, for each segment in the segment usage table, whether the segment is available or unavailable, and wherein the management system is configured to perform operations further comprising:
 for each segment corresponding to the plurality of first disks, identifying that the segment is unavailable; and
 for each new segment corresponding to the plurality of second disks, identifying that the segment is available.

Embodiment 3 is the system of embodiment 2, wherein the management system is configured to perform operations further comprising:
 determining that a particular segment corresponding to the plurality of first disks is again available and, in response, identifying the particular segment as available in the segment usage table;
 determining that the one or more first disks of the capacity object are again available; and
 identifying each segment corresponding to the plurality of first disks as available.

Embodiment 4 is the system of any one of embodiments 2 or 3, further comprising a segment cleaning system that is configured to perform operations comprising:
 receiving a request to perform cleaning on one or more segments; and
 selecting one or more segments to clean, comprising selecting only segments in the segment usage table identified by the field as available.

Embodiment 5 is the system of any one of embodiments 1-4, wherein the plurality of second disks comprises one or more first disks that are available.

Embodiment 6 is the system of any one of embodiments 1-5, wherein the management system is configured to perform operations further comprising:
 determining whether an amount of available storage space is below a threshold;
 in response to determining that the amount of available storage space is below the threshold, sending a request to a segment cleaning system to perform cleaning;
 determining that the one or more first disks of the capacity object are again available; and
 in response to determining that the one or more first disks are again available, increasing the threshold.

Embodiment 7 is the system of embodiment 6, wherein:
 the threshold represents a number of unused segments in the capacity object;
 adding a plurality of new segments corresponding to the second disks to the capacity object comprises adding M new segments to the capacity object; and
 increasing the threshold comprises increasing the threshold by M.

Embodiment 8 is the system of any one of embodiments 1-7, wherein the management system is configured to perform operations further comprising:
 determining that the one or more first disks of the capacity object are again available; and
 in response to determining that the one or more first disks are again available, adding a read-only field to the segment usage table, comprising:
  for each segment corresponding to the plurality of first disks, identifying that the segment is not read-only; and
  for each new segment corresponding to the plurality of second disks, identifying that the segment is read-only,
 wherein a segment cleaning system is configured to prioritize cleaning segments identified as read-only over cleaning segments identified as not read-only.

Embodiment 9 is the system of embodiment 8, wherein the management system is configured to perform operations further comprising, for each new segment:
 determining that the new segment no longer has any live data; and
 in response, removing the new segment from the capacity object.

Embodiment 10 is a method comprising the operations of any one of embodiments 1 to 9.

Embodiment 11 is one or more non-transitory computer storage media encoded with a computer program, the program comprising instructions that are operable, when executed by data processing apparatus, to cause the data processing apparatus to perform the operations of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes described do not necessarily require the particular order shown, or sequential order, to achieve desirable results. In certain implementations, multitasking and parallel processing can be advantageous.

What is claimed is:

1. A system comprising:
a capacity object comprising a plurality of first disks, the plurality of first disks having a corresponding plurality of segments, wherein each segment comprises:
a primary column corresponding to each of a plurality of primary disks, wherein each primary column comprises a plurality of primary storage blocks, and
a parity column corresponding to each of a plurality of parity disks, wherein each parity column comprises a plurality of parity storage blocks;
a segment usage table identifying the plurality of segments of the capacity object, the segment usage table comprising, for each of the segments, data identifying an amount of used or unused storage space in the segment; and
a management system configured to perform operations comprising:
determining that one or more of the first disks are unavailable and, in response:
identifying a plurality of available second disks, adding a plurality of new segments corresponding to the second disks to the capacity object, and adding data identifying the plurality of new segments to the segment usage table; and
for each of one or more new write requests to the capacity object:
identifying an available segment from the plurality of new segments, and
writing data associated with the new write request to the identified available segment.

2. The system of claim 1, wherein the segment usage table includes a field that identifies, for each segment in the segment usage table, whether the segment is available or unavailable, and wherein the management system is configured to perform operations further comprising:
for each segment corresponding to the plurality of first disks, identifying that the segment is unavailable; and
for each new segment corresponding to the plurality of second disks, identifying that the segment is available.

3. The system of claim 2, wherein the management system is configured to perform operations further comprising:
determining that a particular segment corresponding to the plurality of first disks is again available and, in response, identifying the particular segment as available in the segment usage table;
determining that the one or more first disks of the capacity object are again available; and
identifying each segment corresponding to the plurality of first disks as available.

4. The system of claim 2, further comprising a segment cleaning system that is configured to perform operations comprising:
receiving a request to perform cleaning on one or more segments; and
selecting one or more segments to clean, comprising selecting only segments in the segment usage table identified by the field as available.

5. The system of claim 1, wherein the plurality of second disks comprises one or more first disks that are available.

6. The system of claim 1, wherein the management system is configured to perform operations further comprising:
determining whether an amount of available storage space is below a threshold;
in response to determining that the amount of available storage space is below the threshold, sending a request to a segment cleaning system to perform cleaning;
determining that the one or more first disks of the capacity object are again available; and
in response to determining that the one or more first disks are again available, increasing the threshold.

7. The system of claim 6, wherein:
the threshold represents a number of unused segments in the capacity object;
adding a plurality of new segments corresponding to the second disks to the capacity object comprises adding M new segments to the capacity object; and
increasing the threshold comprises increasing the threshold by M.

8. The system of claim 1, wherein the management system is configured to perform operations further comprising:
determining that the one or more first disks of the capacity object are again available; and
in response to determining that the one or more first disks are again available, adding a read-only field to the segment usage table, comprising:
for each segment corresponding to the plurality of first disks, identifying that the segment is not read-only; and
for each new segment corresponding to the plurality of second disks, identifying that the segment is read-only,
wherein a segment cleaning system is configured to prioritize cleaning segments identified as read-only over cleaning segments identified as not read-only.

9. The system of claim 8, wherein the management system is configured to perform operations further comprising, for each new segment:
determining that the new segment no longer has any live data; and
in response, removing the new segment from the capacity object.

10. A method comprising:
determining that one or more first disks of a plurality of first disks of a capacity object of a storage system are unavailable, wherein:
the plurality of first disks have a corresponding plurality of segments, and
the storage system comprises a segment usage table identifying the plurality of segments of the capacity object, the segment usage table comprising, for each of the segments, data identifying an amount of used or unused storage space in the segment;
in response to determining that the one or more first disks are unavailable:

identifying a plurality of available second disks,
adding a plurality of new segments corresponding to the second disks to the capacity object, and
adding data identifying the plurality of new segments to the segment usage table; and
for each of one or more new write requests to the capacity object:
identifying an available segment from the plurality of new segments, and
writing data associated with the new write request to the identified available segment.

11. The method of claim 10, wherein the segment usage table includes a field that identifies, for each segment in the segment usage table, whether the segment is available or unavailable, and wherein the method further comprises:
for each segment corresponding to the plurality of first disks, identifying that the segment is unavailable; and
for each new segment corresponding to the plurality of second disks, identifying that the segment is available.

12. The method of claim 11, further comprising:
determining that a particular segment corresponding to the plurality of first disks is again available and, in response, identifying the particular segment as available in the segment usage table;
determining that the one or more first disks of the capacity object are again available; and
identifying each segment corresponding to the plurality of first disks as available.

13. The method of claim 11, further comprising:
receiving a request to perform cleaning on one or more segments; and
selecting one or more segments to clean, comprising selecting only segments in the segment usage table identified by the field as available.

14. The method of claim 10, wherein the plurality of second disks comprises one or more first disks that are available.

15. The method of claim 10, further comprising:
determining whether an amount of available storage space is below a threshold;
in response to determining that the amount of available storage space is below the threshold, sending a request to a segment cleaning system to perform cleaning;
determining that the one or more first disks of the capacity object are again available; and
in response to determining that the one or more first disks are again available, increasing the threshold.

16. The method of claim 15, wherein:
the threshold represents a number of unused segments in the capacity object;
adding a plurality of new segments corresponding to the second disks to the capacity object comprises adding M new segments to the capacity object; and
increasing the threshold comprises increasing the threshold by M.

17. The method of claim 10, further comprising:
determining that the one or more first disks of the capacity object are again available; and
in response to determining that the one or more first disks are again available, adding a read-only field to the segment usage table, comprising:
for each segment corresponding to the plurality of first disks, identifying that the segment is not read-only; and
for each new segment corresponding to the plurality of second disks, identifying that the segment is read-only,
wherein a segment cleaning system is configured to prioritize cleaning segments identified as read-only over cleaning segments identified as not read-only.

18. The method of claim 17, further comprising, for each new segment:
determining that the new segment no longer has any live data; and
in response, removing the new segment from the capacity object.

19. One or more non-transitory computer storage media encoded with computer program instructions that when executed by a plurality of computers cause the plurality of computers to perform operations comprising:
determining that one or more first disks of a plurality of first disks of a capacity object of a storage system are unavailable, wherein:
the plurality of first disks have a corresponding plurality of segments, and
the storage system comprises a segment usage table identifying the plurality of segments of the capacity object, the segment usage table comprising, for each of the segments, data identifying an amount of used or unused storage space in the segment;
in response to determining that the one or more first disks are unavailable:
identifying a plurality of available second disks,
adding a plurality of new segments corresponding to the second disks to the capacity object, and
adding data identifying the plurality of new segments to the segment usage table; and
for each of one or more new write requests to the capacity object:
identifying an available segment from the plurality of new segments, and
writing data associated with the new write request to the identified available segment.

20. The non-transitory computer storage media of claim 19, wherein the segment usage table includes a field that identifies, for each segment in the segment usage table, whether the segment is available or unavailable, and wherein the operations further comprise:
for each segment corresponding to the plurality of first disks, identifying that the segment is unavailable; and
for each new segment corresponding to the plurality of second disks, identifying that the segment is available.

21. The non-transitory computer storage media of claim 20, wherein the operations further comprise:
determining that a particular segment corresponding to the plurality of first disks is again available and, in response, identifying the particular segment as available in the segment usage table;
determining that the one or more first disks of the capacity object are again available; and
identifying each segment corresponding to the plurality of first disks as available.

22. The non-transitory computer storage media of claim 20, wherein the operations further comprise:
receiving a request to perform cleaning on one or more segments; and
selecting one or more segments to clean, comprising selecting only segments in the segment usage table identified by the field as available.

23. The non-transitory computer storage media of claim 19, wherein the plurality of second disks comprises one or more first disks that are available.

24. The non-transitory computer storage media of claim 19, wherein the operations further comprise:

determining whether an amount of available storage space is below a threshold;

in response to determining that the amount of available storage space is below the threshold, sending a request to a segment cleaning system to perform cleaning;

determining that the one or more first disks of the capacity object are again available; and in response to determining that the one or more first disks are again available, increasing the threshold.

25. The non-transitory computer storage media of claim 24, wherein:

the threshold represents a number of unused segments in the capacity object;

adding a plurality of new segments corresponding to the second disks to the capacity object comprises adding M new segments to the capacity object; and increasing the threshold comprises increasing the threshold by M.

26. The non-transitory computer storage media of claim 19, wherein the operations further comprise:

determining that the one or more first disks of the capacity object are again available; and in response to determining that the one or more first disks are again available, adding a read-only field to the segment usage table, comprising:

for each segment corresponding to the plurality of first disks, identifying that the segment is not read-only; and for each new segment corresponding to the plurality of second disks, identifying that the segment is read-only, wherein a segment cleaning system is configured to prioritize cleaning segments identified as read-only over cleaning segments identified as not read-only.

27. The non-transitory computer storage media of claim 26, wherein the operations further comprise, for each new segment:

determining that the new segment no longer has any live data; and in response, removing the new segment from the capacity object.

* * * * *